United States Patent
Hatanaka

(10) Patent No.: US 7,835,165 B2
(45) Date of Patent: Nov. 16, 2010

(54) POWER CONVERTING APPARATUS

(75) Inventor: Keita Hatanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 200 days.

(21) Appl. No.: 12/064,898

(22) PCT Filed: May 23, 2006

(86) PCT No.: PCT/JP2006/310201
§ 371 (c)(1),
(2), (4) Date: Feb. 26, 2008

(87) PCT Pub. No.: WO2007/135730
PCT Pub. Date: Nov. 29, 2007

(65) Prior Publication Data
US 2009/0244945 A1    Oct. 1, 2009

(51) Int. Cl.
*H02M 7/12* (2006.01)
*H02M 7/81* (2006.01)
*H02M 7/23* (2006.01)

(52) U.S. Cl. .............. 363/69; 363/70; 363/81

(58) Field of Classification Search .......... 363/67, 363/69, 70, 81, 84, 87
See application file for complete search history.

(56) References Cited

U.S. PATENT DOCUMENTS

| | | | | |
|---|---|---|---|---|
| 4,451,773 A | * | 5/1984 | Papathomas et al. | 320/128 |
| 5,956,244 A | * | 9/1999 | Rehm et al. | 363/70 |
| 5,963,441 A | | 10/1999 | Gibbs et al. | |
| 6,307,763 B1 | * | 10/2001 | Chavez et al. | 363/70 |
| 7,355,865 B2 | * | 4/2008 | Royak et al. | 363/44 |
| 2005/0276082 A1 | * | 12/2005 | Panda et al. | 363/70 |

FOREIGN PATENT DOCUMENTS

| | | |
|---|---|---|
| JP | 61-218373 A | 9/1986 |
| JP | 3-14989 | 2/1991 |
| JP | 6-153519 A | 5/1994 |
| JP | 9-037552 A | 2/1997 |
| JP | 2000-350461 A | 12/2000 |
| JP | 2003-134833 A | 5/2003 |

OTHER PUBLICATIONS

Form PCT/ISA/210 (International Search Report) dated Aug. 29, 2006.

(Continued)

*Primary Examiner*—Gary L Laxton
*Assistant Examiner*—Fred E Finch, III
(74) *Attorney, Agent, or Firm*—Buchanan Ingersoll & Rooney PC

(57) ABSTRACT

In a power converting apparatus in which two three-phase converters (1), (2) are operated parallel to one another, the three-phase converters (1), (2) are controlled by using d- and q-axis voltage commands. DC current sensors (26), (27) detect individual output DC currents (26*a*), (27*a*) of the three-phase converters (1), (2), and a d-axis voltage command vdr for each of the three-phase converters (1), (2) is corrected in a manner that reduces a difference between the output DC currents (26*a*), (27*a*). In this way, an output imbalance between the two three-phase converters (1), (2) is corrected while decreasing limitations on arrangement of the DC current sensors (26), (27).

3 Claims, 3 Drawing Sheets

OTHER PUBLICATIONS

Jong-Moo Lee et al. "A Study on DC Power Regeneration for Railway Using Parallel PWM Converter", Jul. 2004, pp. 524-527.
Zhong-Chao Zhang et al. "Multimodular Current-Source SPWM Converters for Superconducting a Magnetic Energy Storage System", IEEE Transactions on Power Electronics, vol. 8, No. 3, Jul. 1993, pp. 250-256.
"A Study on the Compensation Technique of Power Deviation for Parallel Operation of On-line UPS System" Dec. 2003, 173 pages.
Korean Office Action, dated Nov. 26, 2009.
Canadian Office Action, dated Dec. 4, 2009.

* cited by examiner

POWER CONVERTING APPARATUS

TECHNICAL FIELD

The present invention relates to a power converting apparatus including a plurality of power converters for converting AC power into DC power which are operated parallel to one another.

BACKGROUND ART

A conventional power converting apparatus includes a plurality of forward power converters each of which is controlled based on a pulse width modulation (PWM) signal obtained from a comparison of a command signal corresponding to the waveform of an output voltage and a carrier signal, wherein the plurality of forward power converters are operated parallel to one another with inputs and outputs thereof connected in parallel. Provided with DC current difference sensing means at DC output terminals of each of the aforementioned forward power converters for detecting a difference between a positive-terminal current component and a negative-terminal current component, each of the forward power converters corrects one of the aforementioned command signal and the aforementioned carrier signal in a manner that decreases a detected DC current difference component. In this way, a circulating current flowing among the plural forward power converters is decreased (refer to Patent Document 1, for example).

Patent Document 1: Japanese Patent Application Publication No. 1994-153519

DISCLOSURE OF THE INVENTION

Problems to be Solved by the Invention

The conventional power converting apparatus detects the difference between the positive-terminal current component and the negative-terminal current component of a DC output of each forward power converter and decreases the circulating current by reducing this difference for correcting an output imbalance among the plurality of forward power converters during parallel operation thereof. For this purpose, it is necessary to detect the difference between the aforementioned positive-terminal current component and the aforementioned negative-terminal current component at the same point in time, and this imposes limitations on arrangement of current sensors.

The present invention has been made to solve the aforementioned problem. Accordingly, it is an object of the invention to enable correction of an output imbalance among a plurality of forward power converters without the need to detect a difference between a positive-terminal current component and a negative-terminal current component of each DC output during parallel operation of the plurality of forward power converters, and thereby provide an improved variation in arrangement of current sensors for detecting the output imbalance.

Means for Solving the Problems

A power converting apparatus of the present invention is so configured as to operate a plurality of three-phase converters for converting AC power into DC power parallel to one another with inputs and outputs of the three-phase converters connected in parallel. The power converting apparatus detects individual output DC currents of the aforementioned plurality of three-phase converters and corrects AC-side voltage commands for the aforementioned individual three-phase converters in a manner that reduces a difference between the output DC currents.

Advantageous Effects of the Invention

The power converting apparatus of the present invention detects the individual output DC currents of the plurality of three-phase converters and corrects the AC-side voltage commands for the aforementioned individual three-phase converters in a manner that reduces the difference between the output DC currents. For this reason, it becomes possible to decrease limitations on arrangement of current sensors for detecting an output imbalance and thus correct the output imbalance. It is therefore possible to improve the degree of freedom in design and obtain a power converting apparatus in which three-phase converters are operated parallel to one another under conditions balanced with high accuracy.

Figure 1:
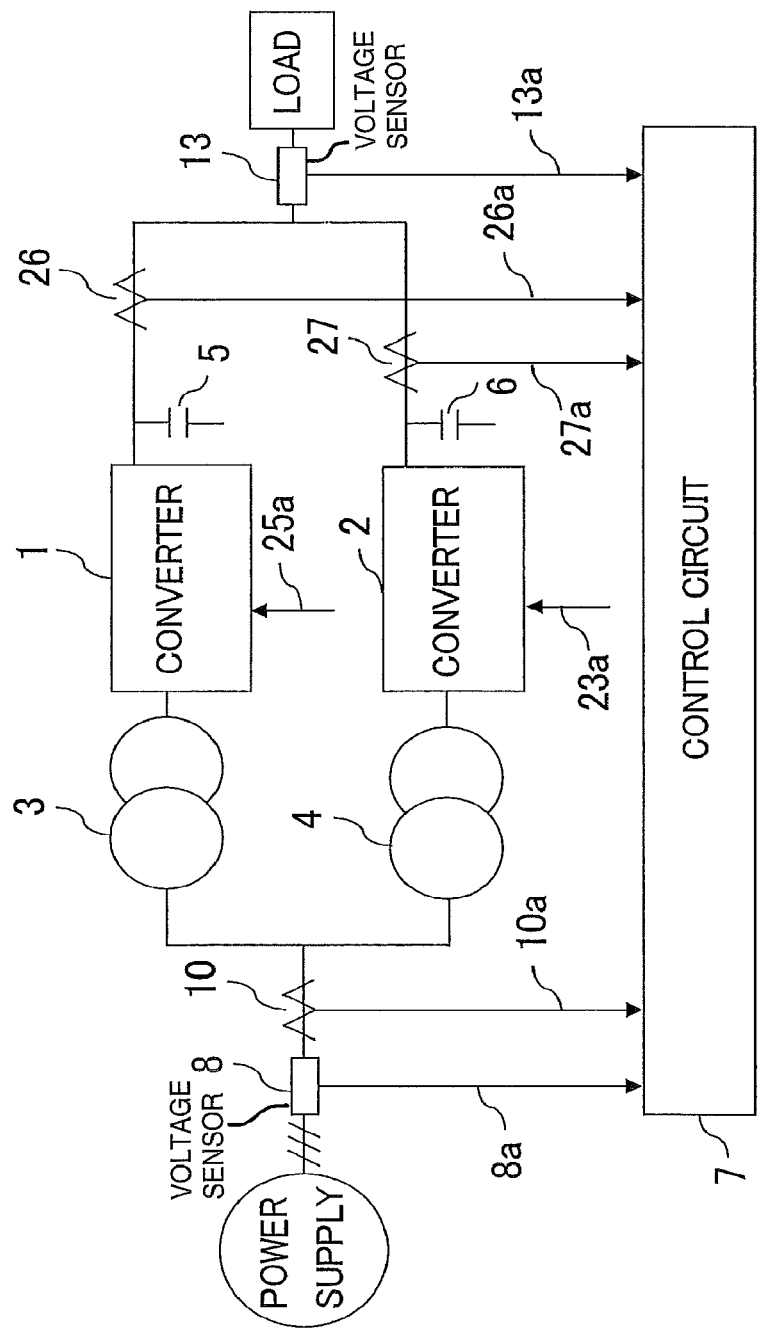
FIG. 1 is a circuit diagram showing the configuration of a power converting apparatus according to a first embodiment of the present invention.
Figure 2:
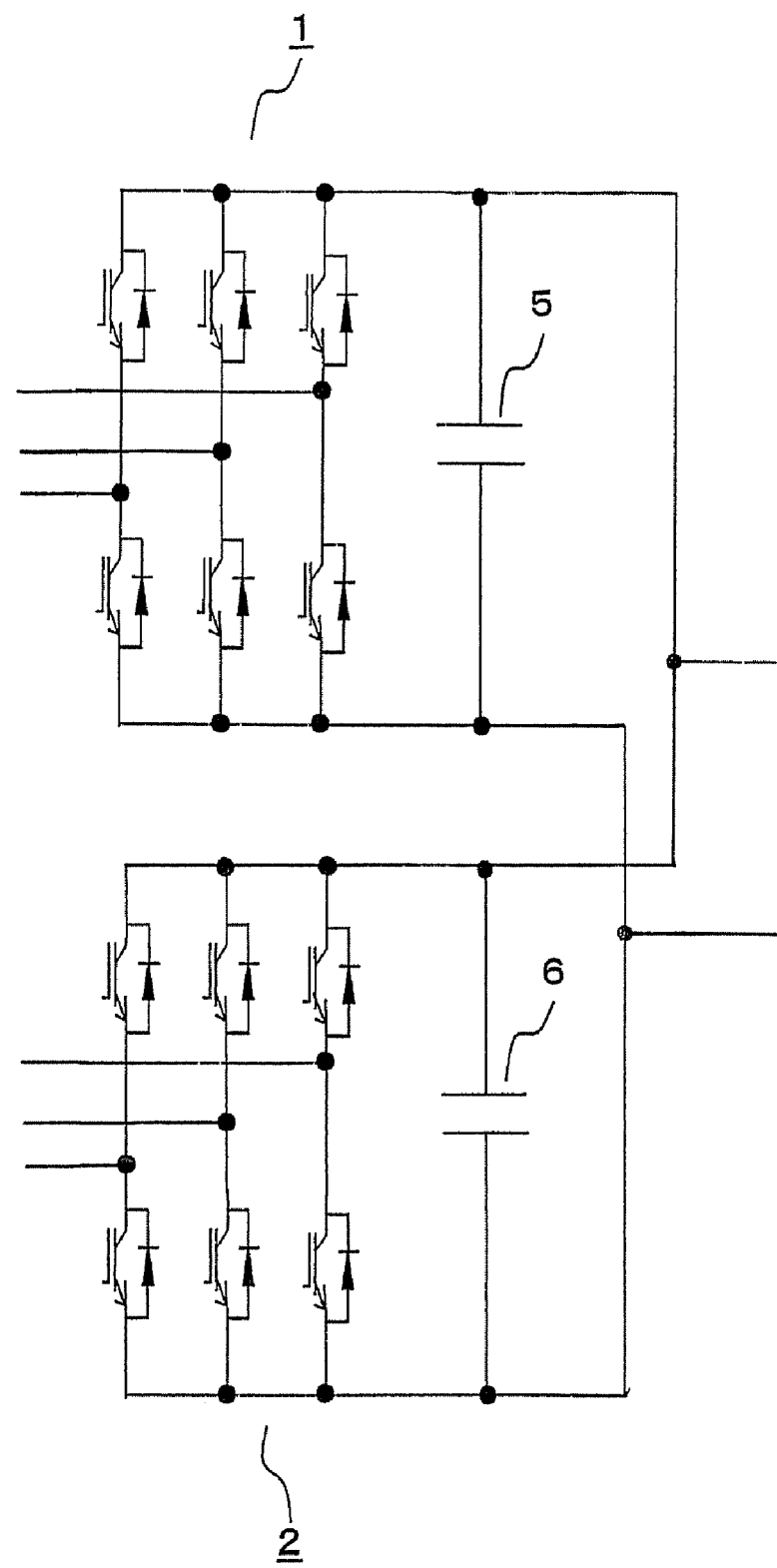
FIG. 2 is a circuit diagram showing details of each converter of the power converting apparatus according to the first embodiment of the present invention.

DESCRIPTION OF THE SYMBOLS 1, 2 Three-phase converters
9 Two-phase (d, q) DC voltage coordinate converter/phase detector
11 Input current coordinate converter
20, 21 Output voltage coordinate converters
20a, 21a Three-phase voltage commands
26, 27 DC current sensors
26a, 27a Output DC currents
28a d-axis voltage correction value
29 Adder
30 Subtracter
vdr d-axis voltage command
vqr q-axis voltage command

BEST MODE FOR CARRYING OUT THE INVENTION

First Embodiment

FIG. 1 is a circuit diagram showing the configuration of a power converting apparatus according to a first embodiment of the present invention. As shown in the Figure, the power converting apparatus constitutes a parallel operation system including a pair of three-phase PWM converters 1, 2 (hereinafter referred to simply as the three-phase converters 1, 2). The three-phase converters 1, 2, which are provided with transformers 3, 4 on an AC input side and capacitors 5, 6 on a DC output side, respectively, are connected in parallel to each other and controlled by a PWM technique using PWM signals 25a, 23a generated by a control circuit 7 such that converter outputs will be balanced with each other. Designated by 8 is a voltage sensor for detecting an input AC voltage 8a, designated by 10 is a current sensor for detecting an input AC current 10a, designated by 13 is a voltage sensor for detecting an output DC voltage 13a, and designated by 26, 27 are DC current sensors for detecting output DC currents 26a, 27a of the three-phase converters 1, 2, respectively. The input AC voltage 8a, the input AC current 10a, the output DC voltage 13a and the individual output DC currents 26a, 27a of the three-phase converters 1, 2 are input into the control circuit 7.

Each of the three-phase converters 1, 2 is a full-bridge, three-phase converter configured with a plurality of semiconductor switching devices, each including diodes connected in reverse parallel. The DC current sensors 26, 27 each detect a positive-terminal current component or a negative-terminal current component of the DC output of each of the three-phase converters 1, 2.

Figure 3:
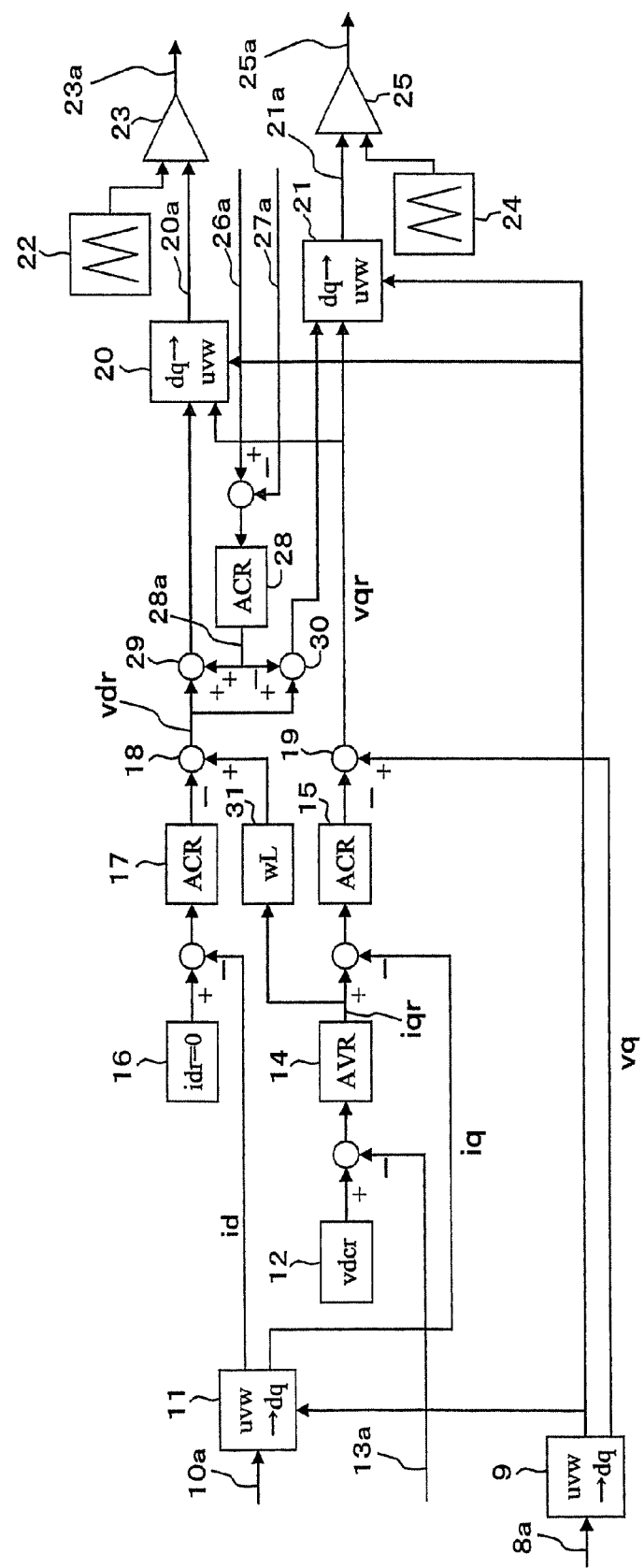
FIG. 3 is a circuit diagram showing details of a control circuit of the power converting apparatus according to the first embodiment of the present invention.

FIG. 3 is a circuit diagram showing details of the control circuit 7. Operation for controlling the power converting apparatus is explained below with reference to FIG. 3.

The two three-phase converters 1, 2 are controlled in such a manner that an input-side power factor equals 1 and the output DC voltage is kept constant.

A two-phase (d, q) DC voltage coordinate converter/phase detector 9 generates and outputs phases referenced to a U-phase using the three-phase input AC voltage 8a detected by the voltage sensor 8 as an input and converts the three-phase input AC voltage 8a into input voltages on d- and q-axes. A current coordinate converter 11 performs coordinate conversion to convert the three-phase input AC current 10a into two-phase (d, q) DC currents referenced to the aforementioned phase using the three-phase input AC current 10a detected by the current sensor 10 and the phases fed from the two-phase (d, q) DC voltage coordinate converter/phase detector 9 as inputs, and outputs a d-axis current id and a q-axis current iq.

What is needed to control the input-side power factor to become equal to 1 is to keep the d-axis current id at 0. Thus, a d-axis current command idr output from a d-axis current command generator 16 is set at 0. Also, the q-axis current is controlled in a way to keep the output DC voltage constant for controlling the d-axis current to become equal to 0.

Using a difference between an output DC voltage command from an output DC voltage command generator 12 and the output DC voltage 13a detected by the voltage sensor 13 as an input, an operational amplifier 14 provides an output obtained by proportional-integral control (PI control) operation, that is, a q-axis current command iqr. Using a difference between this q-axis current command iqr and the q-axis current iq output from the current coordinate converter 11 as an input, an operational amplifier 15 provides an output obtained by proportional-integral control (PI control) operation. A subtracter 19 subtracts this output from a q-axis voltage is which is an output of the two-phase (d, q) DC voltage coordinate converter/phase detector 9 to produce a q-axis voltage command vqr.

Also, using the q-axis current command iqr as an input, a multiplier 31 calculates a voltage drop caused by inductance values of the transformers 3, 4. Using a difference between the d-axis current command idr (=0) and the d-axis current id output from the current coordinate converter 11 as an input, an operational amplifier 17 provides an output obtained by proportional-integral control (PI control) operation. A subtracter 18 subtracts this output from an output of the multiplier 31 to produce a d-axis voltage command vdr.

While the individual converters 1, 2 are controlled by three-phase voltage commands obtained by converting the d-axis voltage command vdr and the q-axis voltage command vqr, the voltage commands are corrected based on a difference between the output DC currents 26a and 27a of the three-phase converters 1, 2 detected by the DC current sensors 26, 27, respectively, in this embodiment.

Using a DC current difference obtained by subtracting the output DC current 27a of the three-phase converter 2 from the output DC current 26a of the three-phase converter 1 as an input, an operational amplifier 28 calculates a d-axis voltage correction value 28a by proportional-integral control (PI control) operation. An adder 29 calculates a d-axis voltage command vdr to be given to the three-phase converter 2 by adding the d-axis voltage correction value 28a to the d-axis voltage command vdr calculated as discussed above, whereas a subtracter 30 calculates a d-axis voltage command vdr to be given to the three-phase converter 1 by subtracting the d-axis voltage correction value 28a from the d-axis voltage command vdr calculated as discussed above. On the other hand, the q-axis voltage command vqr is used as q-axis voltage commands vqr to be given to the three-phase converters 1, 2 without making any correction.

Coordinate converters 20, 21 convert the d- and q-axis voltage commands vdr, vqr for the three-phase converters 2, 1 into three-phase voltage commands 20a, 21a, and comparators 23, 25 generate the PWM signals 23a, 25a by comparing the three-phase voltage commands 20a, 21a with carrier signals fed from carrier signal generators 22, 24, respectively. ON/OFF signals for the semiconductor switching devices of the three-phase converter 2 are generated by the PWM signal 23a while ON/OFF signals for the semiconductor switching devices of the three-phase converter 1 are generated by the PWM signal 25a for controlling the three-phase converters 2, 1, respectively.

While an imbalance in the output DC currents of the two parallel-operated three-phase converters 1, 2 occurs due to a deviation of ON/OFF timings of semiconductor switching devices, for instance, it is possible to balance the output DC currents with high accuracy by correcting the d-axis voltage command vdr to reduce the difference in the output DC currents in the aforementioned manner and thereby adjusting input power.

Also, it is needed for the DC current sensors 26, 27 to detect only one of the positive-terminal and negative-terminal current components of the DC output of each of the three-phase converters 1, 2. This serves to decrease limitations on arrangement of the DC current sensors 26, 27 to a considerable extent and improve the variation in design as compared to the prior art.

Also, the foregoing embodiment calculates the d-axis voltage correction value 28a by performing the proportional-integral control (PI control) operation using the difference between the output DC currents 26a and 27a as an input, corrects the d-axis voltage command vdr for the three-phase converter 1 by subtracting the d-axis voltage correction value 28a therefrom, and corrects the d-axis voltage command vdr for the three-phase converter 2 by adding the d-axis voltage correction value 28a thereto. For this reason, it is possible to balance the output DC currents with high accuracy in an easy and reliable fashion by correcting the d-axis voltage command vdr.

It is to be noted that d-axis voltage correction values for the individual three-phase converters 1, 2 may be calculated by performing the proportional-integral control (PI control) operation using differences of the individual output DC currents 26a, 27a from average values thereof instead of directly calculating the difference between the output DC currents 26a and 27a, wherein the d-axis voltage command vdr for the individual three-phase converters 1, 2 is corrected by adding the aforementioned d-axis voltage correction values. This approach makes it possible to similarly balance the output DC currents with high accuracy. In this case, it is possible to similarly control a power converting apparatus provided with three or more parallel-operated three-phase converters and balance individual output DC currents of the three or more three-phase converters.

INDUSTRIAL APPLICABILITY

The present invention is widely applicable to a parallel operation system in which a plurality of forward power converters using vector control are operated in parallel.

The invention claimed is:

1. A power converting apparatus including a plurality of three-phase converters for converting AC power into DC power which are operated parallel to one another with inputs and outputs of the three-phase converters connected in parallel,
wherein said power converting apparatus detects an input AC current, an input AC voltage and individual output DC currents of said plurality of three-phase converters and corrects AC-side voltage commands for said individual three-phase converters in a manner that reduces a difference between the output DC currents using the detected input AC voltage, input AC current and the individual output DC currents, and
wherein said individual three-phase converters are controlled by using d- and q-axis voltage commands, a d-axis voltage correction value is calculated based on said individual output DC currents, and said d-axis voltage command is corrected by adding and subtracting said d-axis voltage correction value to and from said d-axis voltage command.

2. The power converting apparatus as recited in claim 1, wherein said power converting apparatus obtains said d-axis voltage correction value for said individual three-phase converters by performing proportional-integral control (PI control) operation using deviations of values of the individual output DC currents of said plurality of three-phase converters from average values of said individual output DC currents.

3. The power converting apparatus as recited in claim 1, wherein said plurality of three-phase converters are two three-phase converters including a first converter and a second converter which are operated parallel to each other, and said power converting apparatus obtains said d-axis voltage correction value by subtracting the output DC current of said second converter from the output DC current of said first converter and performing proportional-integral control (PI control) operation, corrects the d-axis voltage command for said first converter by subtracting said d-axis voltage correction value from said d-axis voltage command, and corrects the d-axis voltage command for said second converter by adding said d-axis voltage correction value to said d-axis voltage command.

* * * * *